United States Patent
Gan et al.

(10) Patent No.: US 6,673,487 B2
(45) Date of Patent: Jan. 6, 2004

(54) DOUBLE CURRENT COLLECTOR CATHODE DESIGN USING THE SAME ACTIVE MATERIAL IN VARYING THICKNESSES FOR ALKALI METAL OR ION ELECTROCHEMICAL CELLS

(75) Inventors: Hong Gan, East Amherst, NY (US); Esther S. Takeuchi, East Amherst, NY (US)

(73) Assignee: Wilson Greatbatch Ltd., Clarence, NY (US)

( * ) Notice: Subject to any disclaimer, the term of this patent is extended or adjusted under 35 U.S.C. 154(b) by 252 days.

(21) Appl. No.: 09/975,711

(22) Filed: Oct. 11, 2001

(65) Prior Publication Data

US 2002/0062138 A1 May 23, 2002

Related U.S. Application Data

(60) Provisional application No. 60/249,688, filed on Nov. 17, 2000.

(51) Int. Cl.[7] .......................... H01M 4/02; H01M 4/62; H01M 10/40
(52) U.S. Cl. .................. 429/128; 429/217; 429/232; 429/218.1; 429/219; 429/220; 429/224; 429/231.1; 429/231.5; 429/231.7; 429/231.9; 429/245; 429/330; 29/623.1; 607/9
(58) Field of Search .................. 429/128, 217, 429/232, 218.1, 231.5, 219, 220, 231.1, 224, 231.7, 245, 330, 231.9; 29/623.1; 607/9

(56) References Cited

U.S. PATENT DOCUMENTS

| | | |
|---|---|---|
| 3,520,729 A | 7/1970 | Voss et al. |
| 4,161,063 A | 7/1979 | Goebel et al. |
| 4,292,357 A | 9/1981 | Erisman et al. |
| 4,324,828 A | 4/1982 | Ebato et al. |
| 4,409,730 A | 10/1983 | Goebel |
| 4,439,916 A | 4/1984 | Faber |
| 5,180,642 A | 1/1993 | Weiss et al. |
| 5,571,636 A | 11/1996 | Ohta et al. |
| 5,582,935 A | 12/1996 | Dasgupta et al. |
| 5,639,568 A | 6/1997 | Pedicini et al. |
| 5,658,694 A | 8/1997 | Charkey |
| 5,667,916 A | 9/1997 | Ebel et al. |
| 5,670,276 A | 9/1997 | Takeuchi et al. |
| 5,716,422 A | 2/1998 | Muffoletto et al. |
| 5,744,258 A | 4/1998 | Bai et al. |
| 5,863,676 A | 1/1999 | Charkey et al. |
| 5,993,999 A | 11/1999 | Rivers et al. |

*Primary Examiner*—Laura Weiner
(74) *Attorney, Agent, or Firm*—Michael F. Scalise

(57) ABSTRACT

A new sandwich cathode design is provided comprising a cathode active material provided in at least two different thicknesses. The different thickness cathode structures are then individually pressed on opposite sides of a current collector so that both are in direct contact with the substrate. Preferably, the cathode structure on the side facing the anode is of a lesser thickness than that on the opposite side of the current collector. Such an exemplary cathode design might look like:

SVO(x)/current collector/SVO(y)/current collector/SVO(z), wherein x, y and z represent thicknesses and wherein x and z are lesser than y.

55 Claims, No Drawings

DOUBLE CURRENT COLLECTOR CATHODE DESIGN USING THE SAME ACTIVE MATERIAL IN VARYING THICKNESSES FOR ALKALI METAL OR ION ELECTROCHEMICAL CELLS

CROSS REFERENCE TO RELATED APPLICATION

This application claims priority based on provisional application Serial No. 60/249,688, filed Nov. 17, 2000.

BACKGROUND OF THE INVENTION

This invention relates to the conversion of chemical energy to electrical energy. In particular, the present invention relates to a new sandwich cathode design having a first cathode structure of a first thickness sandwiched between two current collectors and with a second cathode structure of a second thickness in contact with the opposite sides of the current collectors. The active material of the first and second structures is the same. The only difference being that the first thickness is different than the second thickness, and the second thicknesses of the two second cathode structures are preferably the same. The present cathode design is useful for high discharge rate applications, such as experienced by cells powering an implantable medical device.

SUMMARY OF THE INVENTION

In conventional cathode designs, the thickness of the electrode may affect the cell capacity and cell discharge rate capability. In principle, the thicker the cathode in a defined cell volume, the higher the cell capacity. However, in some cases, the cathode discharge rate capability is decreased significantly when a relatively low conductivity cathode active material is used. The reason for this is that the resistance of any electrode is proportional to the thickness or distance from its outer surface to the current collector. Electrode thickness is particularly important and problematic in cell design modeling projections. In some situations, differing electrode thicknesses may make it very difficult to predict how a particular active material which is relatively resistive, either electrically or ionically, may perform. As a result, the active material is precluded from consideration as being impractical as a power source for some design applications.

In the double screen design of the present invention, however, the so called "first cathode structure" disposed between the opposed current collectors is of a different thickness than the so called "second cathode structure" contacting the outsides of the two current collectors. Preferably, the thicknesses of the second cathode structures contacting the outside of the current collectors is the same. Then, the first cathode structure sandwiched between and in direct contact with the cathode current collectors can be either thicker or thinner than the thickness of the second structures, depending on a particular application. This makes it easier to model the discharge rate capability of the cell, even for a new design or application.

One type of chemistry in which the present configuration is particularly useful is a lithium/silver vanadium oxide (Li/SVO) cell. For this couple, silver vanadium oxide cathode active material, possibly devoid of a binder and a conductive diluent, in the form of a first structure of a first thickness is sandwiched between two current collectors. This assembly is further sandwiched between two layers of silver vanadium oxide, binder and conductive diluent, in the form of a second structure of a second thickness, different than the first thickness. It is known that SVO can be pressed into cohesive structures that readily adhere to a current collector without the presence of binder and conductive diluents. As a result, lithium cells with cathodes of this configuration have the same discharge rate capability as that of conventional Li/SVO cells. At the same time, when the intermediate first structure is thicker than the second structures and/or devoid of non-active materials, these cells exhibit higher capacities than that of conventional Li/SVO cells due to the increased amount of active material in the first structure.

Accordingly, one object of the present invention is to improve the performance of lithium electrochemical cells by providing a new concept in electrode design. Further objects of this invention include providing a cell design for improving the capacity and utilization efficiency of lithium-containing cells.

These and other objects of the present invention will become increasingly more apparent to those skilled in the art by reference to the following description.

DETAILED DESCRIPTION OF THE PREFERRED EMBODIMENTS

The electrochemical cell of the present invention is of either a primary chemistry or a secondary, rechargeable chemistry. For both the primary and secondary types, the cell comprises an anode active metal selected from Groups IA, IIA and IIIB of the Periodic Table of the Elements, including lithium, sodium, potassium, etc., and their alloys and intermetallic compounds including, for example, Li—Si, Li—Al, Li—B, Li—Mg and Li—Si—B alloys and intermetallic compounds. The preferred metal comprises lithium. An alternate negative electrode comprises a lithium alloy, such as lithium-aluminum alloy. The greater the amount of aluminum present by weight in the alloy, however, the lower the energy density of the cell.

For a primary cell, the anode is a thin metal sheet or foil of the lithium material, pressed or rolled on a metallic anode current collector, i.e., preferably comprising nickel, to form the negative electrode. In the exemplary cell of the present invention, the negative electrode has an extended tab or lead of the same material as the current collector, i.e., preferably nickel, integrally formed therewith such as by welding and contacted by a weld to a cell case of conductive material in a case-negative electrical configuration. Alternatively, the negative electrode may be formed in some other geometry, such as a bobbin shape, cylinder or pellet to allow an alternate low surface cell design.

In secondary electrochemical systems, the anode or negative electrode comprises an anode material capable of intercalating and de-intercalating the anode active material, such as the preferred alkali metal lithium. A carbonaceous negative electrode comprising any of the various forms of carbon (e.g., coke, graphite, acetylene black, carbon black, glassy carbon, etc.) which are capable of reversibly retaining the lithium species, is preferred for the anode material. A "hairy carbon" material is particularly preferred due to its relatively high lithium-retention capacity. "Hairy carbon" is a material described in U.S. Pat. No. 5,443,928 to Takeuchi et al., which is assigned to the assignee of the present invention and incorporated herein by reference. Graphite is another preferred material. Regardless of the form of the carbon, fibers of the carbonaceous material are particularly advantageous because they have excellent mechanical properties which permit them to be fabricated into rigid electrodes that are capable of withstanding degradation during repeated charge/discharge cycling. Moreover, the high surface area of carbon fibers allows for rapid charge/discharge rates.

A typical negative electrode for a secondary cell is fabricated by mixing about 90 to 97 weight percent "hairy carbon" or graphite with about 3 to 10 weight percent of a binder material, which is preferably a fluoro-resin powder such as polytetrafluoroethylene (PTFE), polyvinylidene fluoride (PVDF), polyethylenetetrafluoroethylene (ETFE), polyamides, polyimides, and mixtures thereof. This negative electrode admixture is provided on a current collector such as of a nickel, stainless steel, or copper foil or screen by casting, pressing, rolling or otherwise contacting the admixture thereto.

In either the primary cell or the secondary cell, the reaction at the positive electrode involves conversion of ions which migrate from the negative electrode to the positive electrode into atomic or molecular forms. For a primary cell, the cathode active material comprises a carbonaceous chemistry or at least a first transition metal chalcogenide constituent which may be a metal, a metal oxide, or a mixed metal oxide comprising at least a first and a second metals or their oxides and possibly a third metal or metal oxide, or a mixture of a first and a second metals or their metal oxides incorporated in the matrix of a host metal oxide. The cathode active material may also comprise a metal sulfide.

Carbonaceous active materials are preferably prepared from carbon and fluorine, which includes graphitic and nongraphitic forms of carbon, such as coke, charcoal or activated carbon. Fluorinated carbon is represented by the formula $(CF_x)_n$ wherein x varies between about 0.1 to 1.9 and preferably between about 0.5 and 1.2, and $(C_2F)_n$ wherein n refers to the number of monomer units which can vary widely.

The metal oxide or the mixed metal oxide is produced by the chemical addition, reaction, or otherwise intimate contact of various metal oxides, metal sulfides and/or metal elements, preferably during thermal treatment, sol-gel formation, chemical vapor deposition or hydrothermal synthesis in mixed states. The active materials thereby produced contain metals, oxides and sulfides of Groups IB, IIB, IIIB, IVB, VB, VIB, VIIB and VIII, which include the noble metals and/or other oxide and sulfide compounds. A preferred cathode active material is a reaction product of at least silver and vanadium.

One preferred mixed metal oxide is a transition metal oxide having the general formula $SM_xV_2O_y$ where SM is a metal selected from Groups IB to VIIB and VIII of the Periodic Table of Elements, wherein x is about 0.30 to 2.0 and y is about 4.5 to 6.0 in the general formula. By way of illustration, and in no way intended to be limiting, one exemplary cathode active material comprises silver vanadium oxide having the general formula $Ag_xV_2O_y$, in any one of its many phases, i.e., β-phase silver vanadium oxide having in the general formula x=0.35 and y=5.8, γ-phase silver vanadium oxide having in the general formula x=0.80 and y=5.40 and ε-phase silver vanadium oxide having in the general formula x=1.0 and y=5.5, and combination and mixtures of phases thereof. For a more detailed description of such cathode active materials reference is made to U.S. Pat. No. 4,310,609 to Liang et al., which is assigned to the assignee of the present invention and incorporated herein by reference.

Another preferred composite transition metal oxide cathode material includes $V_2O_z$ wherein $z \leq 5$ combined with $Ag_2O$ having silver in either the silver(II), silver(I) or silver(0) oxidation state and CuO with copper in either the copper(II), copper(I) or copper(0) oxidation state to provide the mixed metal oxide having the general formula $Cu_xAg_yV_2O_z$, (CSVO). Thus, the composite cathode active material may be described as a metal oxide-metal oxide-metal oxide, a metal-metal oxide-metal oxide, or a metal-metal-metal oxide and the range of material compositions found for $Cu_xAg_yV_2O_z$ is preferably about $0.01 \leq z \leq 6.5$. Typical forms of CSVO are $Cu_{0.16}Ag_{0.67}V_2O_z$ with z being about 5.5 and $Cu_{0.5}Ag_{0.5}V_2O_z$ with z being about 5.75. The oxygen content is designated by z since the exact stoichiometric proportion of oxygen in CSVO can vary depending on whether the cathode material is prepared in an oxidizing atmosphere such as air or oxygen, or in an inert atmosphere such as argon, nitrogen and helium. For a more detailed description of this cathode active material reference is made to U.S. Pat. No. 5,472,810 to Takeuchi et al. and U.S. Pat. No. 5,516,340 to Takeuchi et al., both of which are assigned to the assignee of the present invention and incorporated herein by reference.

In addition to the previously described fluorinated carbon, silver vanadium oxide and copper silver vanadium oxide, $Ag_2O$, $Ag_2O_2$, $CuF_2$, $Ag_2CrO_4$, $MnO_2$, $V_2O_5$, $MnO_2$, $TiS_2$, $CU_2S$, FeS, $FeS_2$, copper oxide, copper vanadium oxide, and mixtures thereof are contemplated as useful active materials.

In secondary cells, the positive electrode preferably comprises a lithiated material that is stable in air and readily handled. Examples of such air-stable lithiated cathode active materials include oxides, sulfides, selenides, and tellurides of such metals as vanadium, titanium, chromium, copper, molybdenum, niobium, iron, nickel, cobalt and manganese. The more preferred oxides include $LiNiO_2$, $LiMn_2O_4$, $LiCoO_2$, $LiCo_{0.92}Sn_{0.08}O_2$ and $LiCo_{1-x}Ni_xO_2$.

To charge such secondary cells, the lithium metal comprising the positive electrode is intercalated into the carbonaceous negative electrode by applying an externally generated electrical potential to the cell. The applied recharging electrical potential serves to draw lithium ions from the cathode active material, through the electrolyte and into the carbonaceous material of the negative electrode to saturate the carbon. The resulting $Li_xC_6$ negative electrode can have an x ranging between 0.1 and 1.0. The cell is then provided with an electrical potential and is discharged in a normal manner.

An alternate secondary cell construction comprises intercalating the carbonaceous material with the active lithium material before the negative electrode is incorporated into the cell. In this case, the positive electrode body can be solid and comprise, but not be limited to, such active materials as manganese dioxide, silver vanadium oxide, titanium disulfide, copper oxide, copper sulfide, iron sulfide, iron disulfide and fluorinated carbon. However, this approach is compromised by problems associated with handling lithiated carbon outside of the cell. Lithiated carbon tends to react when contacted by air or water.

The above described cathode active materials, whether of a primary or a secondary chemistry, are formed into a sandwich electrode body for incorporation into an electrochemical cell by mixing one or more of them with a binder material. Suitable binders are powdered fluoro-polymers, more preferably powdered polytetrafluoroethylene or powdered polyvinylidene fluoride present at about 1 to about 5 weight percent of the cathode mixture. Further, up to about 10 weight percent of a conductive diluent is preferably added to the cathode mixture to improve conductivity. Suitable materials for this purpose include acetylene black, carbon black and/or graphite or a metallic powder such as powdered nickel, aluminum, titanium and stainless steel. The preferred cathode active mixture thus includes a powdered fluoro-polymer binder present at about 1 to 5 weight percent, a conductive diluent present at about 1 to 5 weight percent and about 90 to 98 weight percent of the cathode active material.

According to the present invention, any one of the above cathode active materials, whether of a primary or a secondary cell, is mixed with a binder and a conductive diluent, if desired, and then fabricated into first and second structures such as sheets, plates, pellets, and the like. Preferably, the first and second structures have the same percentage of cathode active material, binder and conductive diluents, no matter what they are. In that respect, the sole distinguishing characteristic of the first and second structures is their thicknesses.

The structures are then individually pressed on opposite sides of a current collector so that both are in direct contact with the substrate. Preferably, the first cathode structure on the side of the current collector spaced from the anode is of a different thickness than that of the second structure on the opposite side of the current collector and facing the anode. More preferably, the first structure is of a greater thickness than the second structure. In other words, the exemplary first structure having the greater thickness never directly faces the lithium anode.

Therefore, one exemplary cathode design has a first cathode structure of a first thickness and a second cathode structure of a second thickness short circuited to each other by parallel connection through the current collectors with the following configuration of cathode structure thicknesses:

cathode structure(x)/current collector/cathode structure (y)/current collector/cathode structure(x), wherein x and y represent thicknesses and wherein x is different than y and, preferably, x is less than y.

Another embodiment of the present invention has a first cathode structure of a first thickness sandwiched between a second cathode structure of a second thickness, in which the second thickness is short circuited to the first thickness by direct contact. This cathode design has the following configuration of cathode structure thicknesses:

cathode structure(x)/current collector/cathode structure (x)/cathode structure(y)/cathode structure(x)/current collector/cathode structure(x), wherein x and y represent thicknesses and wherein x is different than y and, preferably, x is less than y.

Other cathode designs for an exemplary Li/SVO have the following configurations of cathode structure thicknesses:

SVO(x)/current collector/SVO(y)/current collector/SVO (z), wherein x, y and z represent thicknesses and wherein x and z are less than y, or SVO(x)/current collector/SVO(y), wherein x and y represent thicknesses with x being less than y and the SVO(x) thickness facing the anode.

An important aspect of the present invention is that the cathode structure facing the anode is generally of a lesser thickness than the cathode structure spaced from the anode. That way, the rate capability of a particular cell chemistry is maintained as the resistance of the structure nearest the anode is not increased. Generally, as the thickness of an electrode structure increases, its resistance also increases because of the greater distance from the electrode surface to the current collector. In the present invention however, the energy density or discharge efficiency of the cell is increased by having the cathode structure spaced from the anode being greater than that of the near electrode structure. This is simply a function of the greater thickness resulting in more active material. Also, with those active materials such as SVO, $Ag_2O_2$, $Ag_2O$ and $CF_x$, among others, which can be contacted to a current collector without the presence of a binder or a conductive diluent, the energy density of the cell is further increased by eliminating, or at least minimizing, the presence of non-active materials in the cathode structure spaced from the anode.

Cathode components for incorporation into an electrochemical cell according to the present invention may be prepared by rolling, spreading, pressing or otherwise contacting the cathode active material, binder and conductive diluent mixture of the first and second cathode structures onto a suitable current collector selected from the group consisting of stainless steel, titanium, tantalum, platinum, gold, -aluminum, cobalt nickel alloys, highly alloyed ferritic stainless steel containing molybdenum and chromium, and nickel-, chromium-, and molybdenum-containing alloys. The preferred current collector material is titanium, and most preferably the titanium cathode current collector has a thin layer of graphite/carbon paint applied thereto. Cathodes prepared as described above may be in the form of one or more plates operatively associated with at least one or more plates of anode material, or in the form of a strip wound with a corresponding strip of anode material in a structure similar to a "jellyroll".

In order to prevent internal short circuit conditions, the sandwich cathode is separated from the Group IA, IIA or IIIB anode by a suitable separator material. The separator is of electrically insulative material, and the separator material also is chemically unreactive with the anode and cathode active materials and both chemically unreactive with and insoluble in the electrolyte. In addition, the separator material has a degree of porosity sufficient to allow flow there through of the electrolyte during the electrochemical reaction of the cell. Illustrative separator materials include fabrics woven from fluoropolymeric fibers including polyvinylidine fluoride, polyethylenetetrafluoroethylene, and polyethylenechlorotrifluoroethylene used either alone or laminated with a fluoropolymeric microporous film, non-woven glass, polypropylene, polyethylene, glass fiber materials, ceramics, polytetrafluoroethylene membrane commercially available under the designation ZITEX (Chemplast Inc.), polypropylene membrane commercially available under the designation CELGARD (Celanese Plastic Company, Inc.) and a membrane commercially available under the designation DEXIGLAS (C.H. Dexter, Div., Dexter Corp.).

The electrochemical cell of the present invention further includes a nonaqueous, tonically conductive electrolyte which serves as a medium for migration of ions between the anode and the cathode electrodes during electrochemical reactions of the cell. The electrochemical reaction at the electrodes involves conversion of ions in atomic or molecular forms which migrate from the anode to the cathode. Thus, nonaqueous electrolytes suitable for the present invention are substantially inert to the anode and cathode materials, and they exhibit those physical properties necessary for ionic transport, namely, low viscosity, low surface tension and wettability.

A suitable electrolyte has an inorganic, ionically conductive salt dissolved in a nonaqueous solvent, and more preferably, the electrolyte includes an ionizable alkali metal salt dissolved in a mixture of aprotic organic solvents comprising a low viscosity solvent and a high permittivity solvent. The inorganic, ionically conductive salt serves as the vehicle for migration of the anode ions to intercalate or react with the cathode active material. Preferably, the ion forming alkali metal salt is similar to the alkali metal comprising the anode.

In the case of an anode comprising lithium, the alkali metal salt of the electrolyte is a lithium based salt. Known lithium salts that are useful as a vehicle for transport of alkali metal ions from the anode to the cathode include $LiPF_6$, $LiBF_4$, $LiAsF_6$, $LiSbF_6$, $LiClO_4$, $LiO_2$, $LiAlCl_4$, $LiGaCl_4$, $LiC(SO_2CF_3)_3$, $LiN(SO_2CF_3)_2$, $LiSCN$, $LiO_3SCF_3$, $LiC_6F_5SO_3$, $LiO_2CCF_3$, $LiSO_6F$, $LiB(C_6H_5)_4$, $LiCF_3SO_3$, and mixtures thereof.

Low viscosity solvents useful with the present invention include esters, linear and cyclic ethers and dialkyl carbonates such as tetrahydrofuran (THF), methyl acetate (MA), diglyme, trigylme, tetragylme, dimethyl carbonate (DMC), 1,2-dimethoxyethane (DME), 1,2-diethoxyethane (DEE), 1-ethoxy, 2-methoxyethane (EME), ethyl methyl carbonate (EMC), methyl propyl carbonate, ethyl propyl carbonate, diethyl carbonate (DEC), dipropyl carbonate, and mixtures thereof, and high permittivity solvents include cyclic carbonates, cyclic esters and cyclic amides such as propylene carbonate (PC), ethylene carbonate (EC), butylene carbonate, acetonitrile, dimethyl sulfoxide, dimethyl formamide, dimethyl acetamide, γ-valerolactone, γ-butyrolactone (GBL), N-methyl-pyrrolidinone (NMP), and mixtures thereof. In the present invention, the preferred anode for a primary cell is lithium metal and the preferred electrolyte is 0.8M to 1.5M $LiAsF_6$ or $LiPF_6$ dissolved in a 50:50 mixture, by volume, of propylene carbonate as the preferred high permittivity solvent and 1,2-dimethoxyethane as the preferred low viscosity solvent.

A preferred electrolyte for a secondary cell of an exemplary carbon/$LiCoO_2$ couple comprises a solvent mixture of EC:DMC:EMC:DEC. Most preferred volume percent ranges for the various carbonate solvents include EC in the range of about 20% to about 50%; DMC in the range of about 12% to about 75%; EMC in the range of about 5% to about 45%; and DEC in the range of about 3% to about 45%. In a preferred form of the present invention, the electrolyte activating the cell is at equilibrium with respect to the ratio of DMC:EMC:DEC. This is important to maintain consistent and reliable cycling characteristics. It is known that due to the presence of low-potential (anode) materials in a charged cell, an un-equilibrated mixture of DMC:DEC in the presence of lithiated graphite ($LiC_6$~0.01 V vs $Li/Li^+$) results in a substantial amount of EMC being formed. When the concentrations of DMC, DEC and EMC change, the cycling characteristics and temperature rating of the cell change. Such unpredictability is unacceptable. This phenomenon is described in detail in U.S. patent application Ser. No. 09/669,936, filed Sep. 26, 2000, which is assigned to the assignee of the present invention and incorporated herein by reference. Electrolytes containing the quaternary carbonate mixture of the present invention exhibit freezing points below −50° C., and lithium ion secondary cells activated with such mixtures have very good cycling behavior at room temperature as well as very good discharge and charge/discharge cycling behavior at temperatures below −40° C.

The assembly of the primary and secondary cells described herein is preferably in the form of a wound element configuration. That is, the fabricated negative electrode, positive electrode and separator are wound together in a "jellyroll" type configuration or "wound element cell stack" such that the negative electrode is on the outside of the roll to make electrical contact with the cell case in a case-negative configuration. Using suitable top and bottom insulators, the wound cell stack is inserted into a metallic case of a suitable size dimension. The metallic case may comprise materials such as stainless steel, mild steel, nickel-plated mild steel, titanium, tantalum or aluminum, but not limited thereto, so long as the metallic material is compatible for use with components of the cell.

The cell header comprises a metallic disc-shaped body with a first hole to accommodate a glass-to-metal seal/terminal pin feedthrough and a second hole for electrolyte filling. The glass used is of a corrosion resistant type having up to about 50% by weight silicon such as CABAL 12, TA 23, FUSITE 425 or FUSITE 435. The positive terminal pin feedthrough preferably comprises titanium although molybdenum, aluminum, nickel alloy, or stainless steel can also be used. The cell header is typically of a material similar to that of the case. The positive terminal pin supported in the glass-to-metal seal is, in turn, supported by the header, which is welded to the case containing the electrode assembly. The cell is thereafter filled with the electrolyte solution described hereinabove and hermetically sealed such as by close-welding a stainless steel ball over the fill hole, but not limited thereto.

The above assembly describes a case-negative cell, which is the preferred construction of either the exemplary primary or secondary cell of the present invention. As is well known to those skilled in the art, the exemplary primary and secondary electrochemical systems of the present invention can also be constructed in case-positive configuration.

As previously described, the present cells are particularly useful for powering implantable medical devices such as cardiac defibrillators, cardiac pacemakers, nerve stimulators, drug pumps, and the like. As is well known by those skilled in the art, an implantable cardiac defibrillator is a device that requires a power source for a generally medium rate, constant resistance load component provided by circuits performing such functions as, for example, the heart sensing and pacing functions. This medical device monitoring function requires electrical current of about 1 microampere to about 100 milliamperes. From time-to-time, the cardiac defibrillator may require a generally high rate, pulse discharge load component that occurs, for example, during charging of a capacitor in the defibrillator for the purpose of delivering an electrical shock to the heart to treat tachyarrhythmias, the irregular, rapid heartbeats that can be fatal if left uncorrected. This medical device operating function requires electrical current of about 1 ampere to about 4 amperes.

As used herein, the term "pulse" means a short burst of electrical current of a significantly greater amplitude than that of a pre-pulse current immediately prior to the pulse. A pulse train consists of at least two pulses of electrical current delivered in relatively short succession with or without open circuit rest between the pulses.

In that respect, an important aspect of the present invention is that during the medical device monitoring function, i.e., during the medium rate discharge, the first and second cathode structures are in equilibrium as they are both discharging at about the same rate or equally sharing the current load. However, during the medical device operating function, i.e., during the high rate, pulse discharge, only the second cathode structure on the outside of the current collectors and facing the anode is discharged. Then, when the cell returns to the medical device monitoring function, the first cathode structure intermediate the current collectors serves to re-charge the second cathode structure of the energy lost of spent during the medical device operating function. This charging continues until the first and second cathode structures are at an equilibrated voltage. Consequently, if the cell is subjected to an extended period of relative high current discharge above that required for the device monitoring function, the first and second cathodes are in an unbalanced state until such time as the current load decreases to that at which the first cathode structure is capable of recharging the second cathode structure.

It is appreciated that various modifications to the inventive concepts described herein may be apparent to those of ordinary skill in the art without departing from the spirit and scope of the present invention as defined by the appended claims.

What is claimed is:

1. An electrochemical cell, which comprises:
   a) an anode;
   b) a cathode comprising a cathode active material provided as separate first and second cathode structures, the first cathode structure of a first thickness short circuited with the second cathode structure of a second thickness different than the first thickness, wherein the second structure faces the anode and wherein the first and second cathode structures are of the same cathode active material; and
   c) an electrolyte activating the anode and the cathode.

2. The electrochemical cell of claim 1 wherein the cathode active material is selected from the group consisting of silver vanadium oxide, copper silver vanadium oxide, $V_2O_5$, $MnO_2$, $LiCoO_2$, $LiNiO_2$, $LiMnO_2$, $CuO_2$, $TiS_2$, $Cu_2S$, FeS, $FeS_2$, copper oxide, copper vanadium oxide, $CF_x$, $Ag_2O$, $Ag_2O_2$, CuF, $Ag_2CrO_4$, and mixtures thereof.

3. The electrochemical cell of claim 1 wherein the first and second cathode structures include non-active materials selected from either a binder material or a conductive additive, and mixtures thereof.

4. The electrochemical cell of claim 3 wherein the binder material is a fluoro-resin powder.

5. The electrochemical cell of claim 3 wherein the conductive additive is selected from the group consisting of carbon, graphite powder, acetylene black, titanium powder, aluminum powder, nickel powder, stainless steel powder, and mixtures thereof.

6. The electrochemical cell of claim 1 wherein the cathode has a configuration of: first cathode structure(x)/first current collector/second cathode structure (y) /second current collector/third cathode structure(z), wherein x, y and z represent thicknesses.

7. The electrochemical cell of claim 6 wherein x and z are both either less than or greater than y.

8. The electrochemical cell of claim 7 wherein x and z are of the same thickness and less than that of y.

9. The electrochemical cell of claim 7 wherein x and z are of different thicknesses and less than that of y.

10. The electrochemical cell of claim 1 wherein the cathode has the configuration, of: first cathode structure(v)/first current collector/second cathode structure(w)/third cathode structure (y)/fourth cathode structure (x)/second current collector/fifth cathode structure(z), wherein v, w, x, y and z represent thicknesses and wherein v, w, x and z are all either less than or greater than y.

11. The electrochemical cell of claim 1 wherein the cathode has the configuration of: first cathode structure(x)/first current collector/second cathode structure(y), wherein x and y represent thicknesses and wherein x is less than y with the cathode structure(x) facing the anode.

12. The electrochemical cell of claim 1 wherein the cathode has the configuration of: silver vanadium oxide(x)/first current collector/silver vanadium oxide(y)/second current collector/silver vanadium oxide(x), wherein x and y represent thicknesses and wherein x is less than y.

13. The electrochemical cell of claim 1 wherein the cathode has the configuration of silver vanadium oxide(x)/first current collector/silver vanadium oxide(x)/silver vanadium oxide(y)/silver vanadium oxide(x)/second current collector/silver vanadium oxide(y), wherein x and y represent thicknesses and wherein x is less than y.

14. The electrochemical cell of claim 1 wherein the anode is lithium and the cathode has the configuration of: silver vanadium oxide(x)/current collector/silver vanadium oxide (y), wherein x and y represent thicknesses and wherein x is less than y with the silver vanadium oxide (x) structure facing the lithium anode.

15. The electrochemical cell of claim 1 wherein the anode is of an alkali metal and the electrolyte is of a nonaqueous chemistry.

16. The electrochemical cell of claim 1 of either a primary or a secondary chemistry.

17. In combination with an implantable medical device requiring a substantially constant discharge current during a medical device monitoring function and at least one current pulse discharge for a medical device operating function, an electrochemical cell, which comprises:
   a) an anode;
   b) a cathode comprising a cathode active material provided as separate first and second cathode structures, the first cathode structure of a first thickness sandwiched between a first and second current collectors and with the second cathode structure of a second thickness contacting at least one of the first and second current collectors opposite the first cathode structure and facing the anode, wherein the second thickness is different than the first thickness and wherein the first and second cathode structures are of the same cathode active material; and
   c) a nonaqueous electrolyte activating the anode and the cathode.

18. The combination of claim 17 wherein the medical device monitoring function requires electrical current of about 1 microampere to about 100 milliamperes, and wherein the medical device operating function requires current of about 1 ampere to about 4 amperes.

19. The combination of claim 18 wherein the medical device monitoring function is provided by both the first and the second cathode structures.

20. The combination of claim 18 wherein the medical device operating function is substantially provided by the second cathode structure.

21. The combination of claim 17 wherein the first and second cathode structures include non-active materials selected from either a binder material or a conductive additive, and mixtures thereof.

22. The combination of claim 17 wherein the anode is lithium, the first cathode structure is of silver vanadium oxide present in a first thickness (x), the second cathode structure is of silver vanadium oxide present in a second thickness of (y), wherein x is less than y with the first cathode structure facing the anode.

23. The combination of claim 17 wherein the cathode has the configuration of: silver vanadium oxide(x)/current collector/silver vanadium oxide(y)/current collector/silver vanadium oxide(x), wherein x and y represent thicknesses and wherein x is different than y.

24. The combination of claim 17 wherein the cathode has the configuration of: silver vanadium oxide(x)/current collector/silver vanadium oxide (y) /current collector/silver vanadium oxide(z), wherein x, y and z represent thicknesses and wherein x and z are different than y.

25. The combination of claim 24 wherein x and z are of the same thickness and less than that of y.

26. The combination of claim 24 wherein x and z are of different thicknesses and less than that of y.

27. The combination of claim 17 wherein the cathode has the configuration of: $LiCoO_2$ (x)/current collector/$LiCoO_2$ (y)/current collector/$LiCoO_2$ (z), wherein x, y and z represent thicknesses and wherein x and z are less than y.

28. The combination of claim 17 wherein the cathode active material is selected from the group consisting of silver vanadium oxide, copper silver vanadium oxide, $V_2O_5$, $MnO_2$, $LiCoO_2$, $LiNiO_2$, $LiMnO_2$, $CuO_2$, $TiS_2$, $Cu_2S$, FeS, $FeS_2$, copper oxide, copper vanadium oxide, $CF_x$, $Ag_2O$, $Ag_2O_2$, CuF, $Ag_2CrO_4$, and mixtures thereof.

29. The combination of claim 17 wherein the first and second current collectors are selected from the group consisting of stainless steel, titanium, tantalum, platinum, gold, aluminum, cobalt nickel alloys, highly alloyed ferritic stainless steel containing molybdenum and chromium, and nickel-, chromium-, and molybdenum-containing alloys.

30. The combination of claim 17 wherein the first and second current collectors are titanium having a coating selected from the group consisting of graphite/carbon material, iridium, iridium oxide and platinum provided thereon.

31. The combination of claim 17 wherein the electrolyte has a first solvent selected from an ester, a linear ether, a cyclic ether, a dialkyl carbonate, and mixtures thereof, and a second solvent selected from a cyclic carbonate, a cyclic ester, a cyclic amide, and mixtures thereof.

32. The combination of claim 31 wherein the first solvent is selected from the group consisting of tetrahydrofuran, methyl acetate, diglyme, trigylme, tetragylme, dimethyl carbonate, 1,2-dimethoxyethane, 1,2-diethoxyethane, 1-ethoxy,2-methoxyethane, ethyl methyl carbonate, methyl propyl carbonate, ethyl propyl carbonate, diethyl carbonate, dipropyl carbonate, and mixtures thereof, and the second solvent is selected from the group consisting of propylene carbonate, ethylene carbonate, butylene carbonate, acetonitrile, dimethyl sulfoxide, dimethyl formamide, dimethyl acetamide, γ-valerolactone, γ-butyrolactone, N-methyl-pyrrolidinone, and mixtures thereof.

33. The combination of claim 17 including a lithium salt selected from the group consisting of $LiPF_6$, $LiBF_4$, $LiAsF_6$, $LiSbF_6$, $LiClO_4$, $LiO_2$, $LiAlCl_4$, $LiGaCl_4$, LiC $(SO_2 CF_3)_3$, LiN $(SO_2 CF_3)_2$, LiSCN, $LiO_3SCF_3$, $LiC_6F_5SO_3$, $LiO_2CCF_3$, $LiSO_6F$, $LiB(C_6H_5)_4$, $LiCF_3SO_3$, and mixtures thereof.

34. The combination of claim 17 wherein the electrolyte is 0.8 M to 1.5 M $LiAsF_6$ or $LiPF_6$ dissolved in a 50:50 mixture, by volume, of propylene carbonate as the first solvent and 1,2-dimethoxyethane as the second solvent.

35. The combination of claim 17 wherein the anode is of an alkali metal and the electrolyte is of a nonaqueous chemistry.

36. The combination of claim 17 of either a primary or a secondary chemistry.

37. The combination of claim 17 wherein the medical device is selected from the group consisting of a cardiac pacemaker, a cardiac defibrillator, a nerve stimulator and a drug pump.

38. An electrochemical cell, which comprises:
a) an anode;
b) a cathode comprising a cathode active material provided as separate first and second cathode structures, the first cathode structure of a first thickness contacted to one side of a current collector with the second cathode structure of a second thickness contacted to the opposite side of the current collector, wherein the first and second cathode structure are of the same cathode active material and wherein the second cathode structure has a lesser thickness than the first cathode structure and faces the anode; and
c) a nonaqueous electrolyte activating the anode and the cathode.

39. The electrochemical cell of claim 38 wherein the first and second cathode structures include non-active materials selected from either a binder material or a conductive additive, and mixtures thereof.

40. The electrochemical cell of claim 38 wherein the anode is lithium and the cathode has the configuration of: silver vanadium oxide(x)/current collector/silver vanadium oxide(y), wherein the cathode structure silver vanadium oxide(x) faces the anode and wherein x and y represent thicknesses with x being less than y.

41. The electrochemical cell of claim 38 wherein the anode is lithium and the cathode has the configuration of $CF_x(x)$/current collector/$CF_x(y)$, wherein the cathode structure $CF_x(x)$ faces the anode and wherein x and y represent thicknesses with x being less than y.

42. The electrochemical cell of claim 38 wherein the cathode active material is selected from the group consisting of silver vanadium oxide, copper silver vanadium oxide, $V_2O_5$, $MnO_2$, $LiCoO_2$, $LiNiO_2$, $LiMnO_2$, $CuO_2$, $TiS_2$, $Cu_2S$, FeS, $FeS_2$, copper oxide, copper vanadium oxide, $CF_x$, $Ag_2O$, $Ag_2O_2$, CuF, $Ag_2CrO_4$, and mixtures thereof.

43. An electrochemical cell, which comprises:
a) a lithium anode;
b) a cathode comprising a cathode active material selected from the group consisting of silver vanadium oxide, copper silver vanadium oxide, $V_2O_5$, $MnO_2$, $LiCoO_2$, $LiNiO_2$, $LiMnO_2$, $CuO_2$, $TiS_2$, $Cu_2S$, FeS, $FeS_2$, copper oxide, copper vanadium oxide, $CF_x$, $Ag_2O$, $Ag_2O_2$, CuF, $Ag_2CrO_4$, and mixtures thereof, and provided as separate first and second cathode structures, the first cathode structure of a first thickness sandwiched between a first and second titanium current collectors with second cathode structure of a second thickness less than the first cathode structure contacting at least one of the first and second current collectors opposite the first cathode structure and facing the anode, wherein the first and second cathode structures are of the same cathode active material; and
c) a nonaqueous electrolyte activating the anode and the cathode.

44. A method for providing an electrochemical cell, comprising the steps of:
a) providing an anode;
b) providing a cathode comprising a cathode active material provided as separate first and second cathode structures, the first cathode structure of a first thickness short circuited with the second cathode structure of a second thickness, wherein the first and second cathode structures are of the same cathode active material with the second thickness being different than the first thickness; and
c) activating the anode and cathode with a nonaqueous electrolyte activating the anode and the cathode.

45. The method of claim 44 including selecting the cathode active material from the group consisting of silver vanadium oxide, copper silver vanadium oxide, $V_2O_5$, $MnO_2$, $LiCoO_2$, $LiNiO_2$, $LiMnO_2$, $CuO_2$, $TiS_2$, $Cu_2S$, FeS, $FeS_2$, copper oxide, copper vanadium oxide, $CF_x$, $Ag_2O$, $Ag_2O_2$, CuF, $Ag_2CrO_4$, and mixtures thereof.

46. The method of claim 44 including providing the first and second cathode structures having non-active materials selected from either a binder material or a conductive additive, and mixtures thereof.

47. The method of claim 44 including providing the cathode having the configuration of: first cathode structure (x)/first current collector/second cathode structure (y)/second current collector/third cathode structure(x), wherein x and y represent thicknesses and wherein x is either less than or greater than y.

48. The method of claim 44 including providing the cathode having the configuration of: first cathode structure (x)/first current collector/second cathode structure (y)/second current collector/third cathode structure(z), wherein x, y and z represent thicknesses.

49. The method of claim 48 wherein x and z are both either less than or greater than y.

50. The method of claim 48 wherein x and z are of the same thickness and less than that of y.

51. The method of claim 48 wherein x and z are of different thicknesses and less than that of y.

52. The method of claim 44 including providing the cathode having the configuration of: first cathode structure (x)/first current collector/second cathode structure(y), and further having the cathode structure(x) facing the anode, wherein x and y represent thicknesses with x being less than y.

53. The method of claim 44 including providing the cathode having the configuration of: silver vanadium oxide (x)/first current collector/silver vanadium oxide(y)/second current collector/silver vanadium oxide(z), wherein x, y and z represent thicknesses and wherein x and z are less than y.

54. The method of claim 44 including providing the cathode having the configuration of $CF_x(x)$/first current collector/$CF_x(y)$/second current collector/$CF_x(z)$, wherein x, y and z represent thicknesses and wherein x and z are less than y.

55. The method of claim 44 including providing the anode of an alkali metal and the electrolyte of a nonaqueous chemistry.

* * * * *

UNITED STATES PATENT AND TRADEMARK OFFICE
CERTIFICATE OF CORRECTION

PATENT NO.    : 6,673,487 B2
DATED         : January 6, 2004
INVENTOR(S)   : Gan, et al.

It is certified that error appears in the above-identified patent and that said Letters Patent is hereby corrected as shown below:

<u>Column 9,</u>
Line 27, delete "$v_2O_5$" and insert -- "$V_2O_5$" --
Line 54, delete the comma Signed and Sealed this Eighth Day of June, 2004

JON W. DUDAS
*Acting Director of the United States Patent and Trademark Office*